W. G. STEINMETZ.
Bottle-Stopper.
No. 208,647. Patented Oct. 1, 1878.
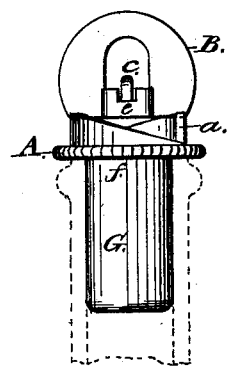
Fig. 1.
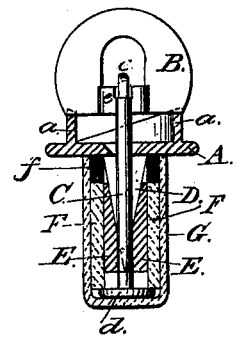
Fig. 2.
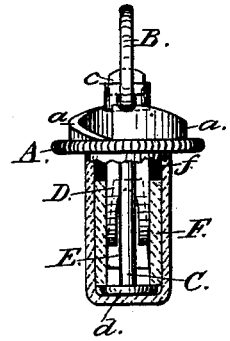
Fig. 3.
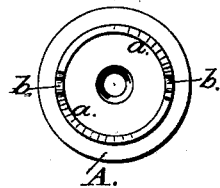
Fig. 4.
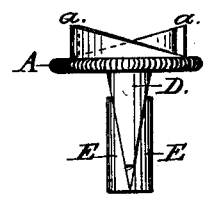
Fig. 5.
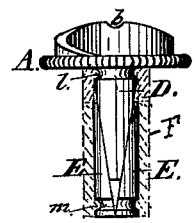
Fig. 6.
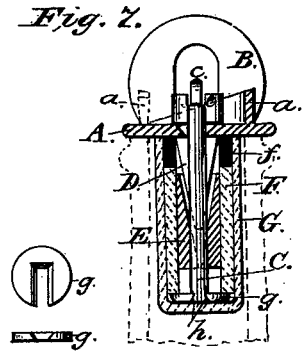
Fig. 7.
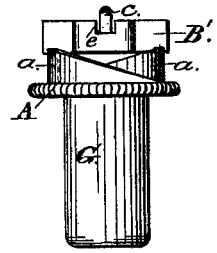
Fig. 8.
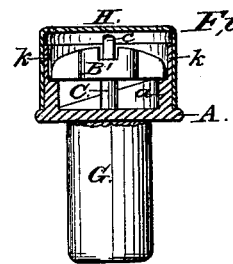
Fig. 9.
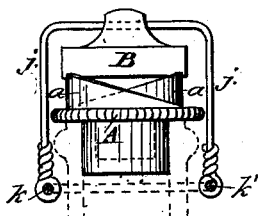
Fig. 10.
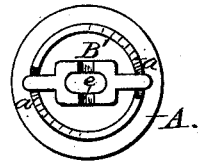
Fig. 11.
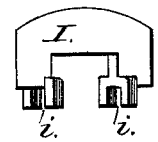
Fig. 12.
Fig. 13.
Witnesses:
Richd. H. Greene.
James Eschwey.
Inventor:
William G. Steinmetz
N. PETERS, PHOTO-LITHOGRAPHER, WASHINGTON, D. C.

UNITED STATES PATENT OFFICE

WILLIAM G. STEINMETZ, OF BROOKLYN, NEW YORK.

IMPROVEMENT IN BOTTLE-STOPPERS.

Specification forming part of Letters Patent No. 208,647, dated October 1, 1878; application filed December 6, 1877.

*To all whom it may concern:*

Be it known that I, WILLIAM G. STEINMETZ, of Brooklyn, in the county of Kings and State of New York, have invented certain new and useful Improvements in Bottle-Stoppers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to bottle-stoppers for bottles containing beer, ale, soda, and other aerated or plain liquors, that can be easily applied, and will firmly seal all kinds of bottles.

The invention consists of a plate provided on its upper side with two cam-shaped projections, against which a locking bar or key that passes over a T-headed bolt operates. On the lower side of the plate is a wedge-shaped projection, which passes between two wedges held in a rubber tube; and said wedges are forced out against the bottle with the rubber tube when the locking-bar is drawn upward on the cams, all of which will be more fully described in the following specification, reference being had to the annexed drawing, in which—

Figure 1 is a side elevation of my stopper as applied to the neck of a bottle. Figs. 2 and 3 are vertical sections of the same. Fig. 4 is a top view of the cam-plate. Figs. 5 and 6 are detail views of the wedges and cam-plate. Fig. 7 is a vertical cross-section of a modification, showing the stopper not locked. Fig. 8 is a side view of another modification. Fig. 9 is a side view of another modification, partly in section. Fig. 10 is a side view of another modification. Fig. 11 is a plan view, showing the locking-bar in position. Fig. 12 is a view of a key for locking the bar. Fig. 13 is a side and bottom view of the locking-bar.

In the drawing, A is a plate, having on its upper side two cams or cam-shaped projections, *a a*, diverging in opposite directions. The upper edges of these cams are provided with notches *b b*, into which the ends of a locking-bar, B, fit when the stopper is locked in position. A bolt, C, passes through the plate A, and has a T-shaped head, *c*, at one end, and a flat head, *d*, at the other end. The locking-bar B is passed over the T-shaped head *c*, and this fits into a notch, *e*, therein. The bar B in its normal position is at the lower side of the cams; and when it is desired to lock the stopper, the locking-bar B is revolved against the faces of the cams a quarter-turn until it engages with the notches *b*, in which it is held. On the lower side of the plate A is cast or otherwise attached a wedge, D, which fits between two loose wedges, E E, placed into a tube of rubber, F, and the wedge D is then forced between them, when the bolt is drawn upon by the locking-bar B as it is revolved on the cams. The wedges E force the rubber tube F, with the covering-tube G, which is closed at one end, against the sides of the bottle, and securely close its mouth. At the upper end of the tube F is arranged a short piece of rubber, *f*, which acts as a spring when loosening the stopper.

In the modification shown in Fig. 6 the wedge-piece D and loose wedges E E are provided with grooves *l m*, into which beads on the rubber tube F fit and prevent it from slipping off.

In the modification shown in Fig. 7 the bolt has in place of the head *d* a detachable plate, *g*, held in dovetail grooves *h* in the end of the bolt C, the other parts being of the same construction as above described.

In the modification shown in Fig. 8 a separate locking-bar, B', is used, which is operated by a key, I, provided with notches *i i*, that fit over the ends of the bar B'.

In the modification shown in Fig. 9 the plate A has an additional ring, *k*, cast on the cams, over which a cap, H, fits, and is secured in any suitable manner, so as to prevent any one from tampering with the stopper.

In the modification shown in Fig. 10 the locking-bar may have a wire, *j j*, secured thereto, which is connected to another one, *k'*, that is secured around the neck of the bottle, and as the locking-bar B is rotated on the cams *a a*, it firmly seals the mouth of the bottle.

The operation will be readily understood by those conversant with the art, and will need no further explanation here.

The advantages of my improved bottle-stopper are, that it can be readily applied to any bottle; it firmly and securely seals the bottles; it is simple in construction, and is not liable to get out of order; it can be furnished at very moderate cost, and can be made of any suitable material.

Having thus described my invention, what I claim is—

1. In a bottle-stopper, the plate A, provided with cams $a\ a$ on its upper side and wedge-piece D on its lower side, as and for the purpose described.

2. In a bottle-stopper, the combination of a plate, A, provided with cams $a\ a$ and wedge-piece D, with the loose wedges E and tube F, arranged substantially as shown and described.

3. The combination of the plate A, constructed as described, with the loose wedges E E, rubber tube F, bolt C, and locking-bar B, arranged substantially as shown, and for the purpose set forth.

4. The plate A, having the cams $a\ a$ and wedge-piece D, in combination with the loose wedges E, bolt C, locking-bar B, and covering-tube G, as shown, and for the purpose described.

5. The plate A, having the cams $a\ a$ and wedge-piece D, in combination with the loose wedges E, bolt C, locking-bar B, tube F, covering-tube G, and spring $f$, all constructed as shown and set forth.

In testimony that I claim the foregoing as my own I hereby affix my signature in presence of two witnesses.

WILLIAM G. STEINMETZ.

Witnesses:
RICHD. H. GREENE,
JAMES ESCHWEGE.